W. E. HORROCKS 2,241,032

LUBRICANT RETAINING CASING

Filed Aug. 1, 1938

INVENTOR
Walter E. Horrocks

Patented May 6, 1941

2,241,032

UNITED STATES PATENT OFFICE 2,241,032

LUBRICANT RETAINING CASING

Walter E. Horrocks, Lakewood, Ohio

Application August 1, 1938, Serial No. 222,351

3 Claims. (Cl. 308—233)

My invention relates to stepped cylindrical lubricant retaining casings, also referred to as jackets, for use with opposing race ring anti-friction bearings of the thrust type, such as automobile clutch release bearings and the like, and bearings which are used in a vertical position, in which the rolling load carrying elements, opposing races and the separating elements are surrounded by a casing for preferably holding a grease lubricant within the bearing, and in which the casing has axial movement relative to one of the opposing race rings, or one of the race rings has axial movement relative to the casing, having for its primary object improved means formed in the casing for axially concentrating the lubricant around the rolling elements within the casing and for retaining the centrifugally actuated lubricant within the bearing and preventing excessive losses of the lubricant from within the casing, such as when the bearing is working under a load and the lubricant is axially compressed into a smaller cubical space and forced centrifugally outward.

In bearings of this nature which operate at high speeds such as shown in the type of patent to L. H. Stein, No. 1,958,725, issued May 15, 1934, the lubricant within the bearing is forced by centrifugal action radially outward to the inner side of the surrounding casing, and axially confined between the inner faces of the uncompressed opposing race rings, as when the bearing is running free without any load and the race rings are spread apart axially from compression against the rolling load carrying elements. When the bearing is placed under a load the opposing race rings are compressed tightly against the rolling load carrying elements which results in compressing the lubricant into a smaller axial space and also creating an open space between the inner side of the surrounding casing flange and the outer face of the adjacent unattached race ring. This results in allowing of the lubricant within the bearing to a centrifugally forced capillary action uninterruptedly along the interior wall of the casing and across the outer rim of the unattached race ring, and then through the open space that is created between the casing flange and the outer face of the race ring which is housed within but unattached to the casing, resulting in the repeated losses of a certain amount of lubricant from within the bearing, each time that the bearing is placed under a load and then released from the load. Bearings of this type are unsuitable for use in a vertical position, especially so if the lubricant becomes excessively liquid.

One of the objects of my invention is to provide means for minimizing the loss of lubricant in bearings of this nature and retaining the lubricant within the bearing.

Another object is to provide an adequate expansion chamber in the stepped casing axially disposed toward the attached race ring and extending radially beyond the outer periphery of the unattached opposing race ring and its housing to receive the axially compressed and centrifugally actuated lubricant as created by the axial movement and reciprocative action of the free moving opposing race ring and the attached casing.

With the above and other objects in view and in order to describe my invention, I have shown it in connection with a self contained thrust bearing using balls for the rolling load carrying elements which are allowed to fluctuate radially to agitate the larger volume of lubricant within the casing that is made possible by utilizing a separator that does not circumscribe the rolling elements such as shown in my patent application Serial No. 94,074 filed August 3, 1936, in which the projections extending between the rolling elements shown in my Patent No. 1,994,996 have been modified in length, it being understood that this invention is applicable to thrust bearings employing other types of rolling load carrying elements than what are shown in this application, such as cylindrical and taper roller bearings as shown in my application Serial No. 218,286, filed July 9, 1938.

Figure 1:
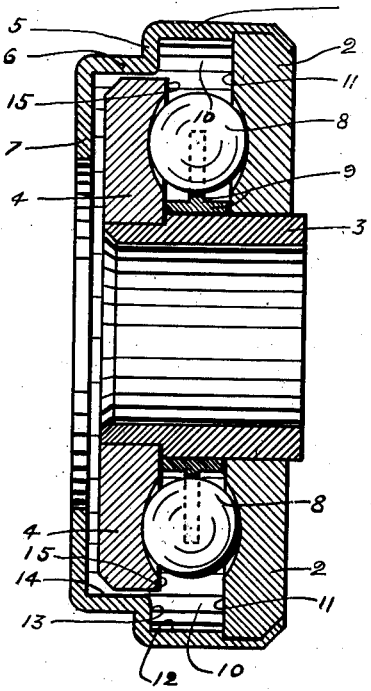
Fig. 1 is a cross section view of a stepped cylindrical lubricant retaining casing applied to a self contained thrust bearing showing the opposing races compressed against the ball bearing load carrying elements as when the bearing is working under a load.

Referring to the drawing, Fig. 1 shows a stepped lubricant retaining casing 1 which is securely attached to a race ring 2 which is mounted for reciprocative axial movement on a collar 3 with the opposite end of the collar 3 having an opposing race ring 4 securely attached to the end of the collar. The stepped lubricant retaining casing 1 has an inward projecting concentric ring section 5, defining a step connected to a race ring housing 6 which surrounds the opposing race ring 4. The race ring housing 6 has an inwardly extending flange 7 surrounding the opposing race ring 4 and having a small amount of clearance between the inner side of the flange 7 and the outer face of the opposing race ring 4 which is necessary for imposing and releasing the thrust load on the ball bearings 8 which are equally spaced annular between the opposing race rings 2 and 4 by means of a separating element 9 which is journaled on the collar 3. The void space within the bearing casing is preferably filled with a grease lubricant (not shown) for the lubrication of the co-acting elements.

Figure 2:
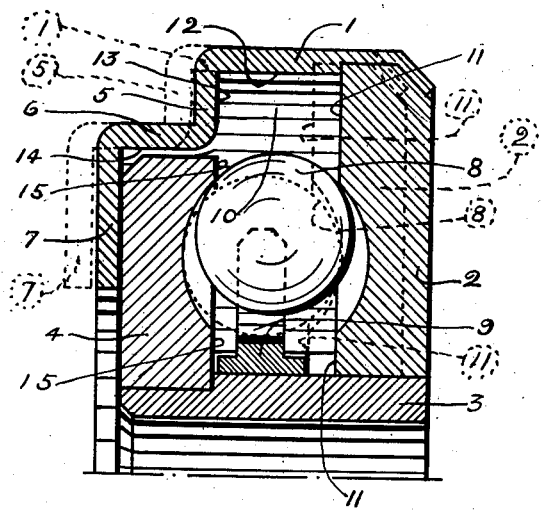
Fig. 2 is a partial enlarged section view showing the relative position of the stepped lubricant retaining casing to the opposing race rings and the ball bearings, in full lines as when the bearing is running free and is not under a load, and in dotted lines as when the bearing is operating under a load and is not running free.

Referring to Fig. 2 which shows the relative position of the stepped lubricant retaining casing 1 with the opposing race rings 2 and 4 and the ball bearings 8 as when the bearing is running free without any load and the centrifugal action of the bearing rotating at high speed forces the balls 8 radially outward and the lubricant that is contained in the open spaces within the bearing surrounding the balls 8 is also forced centrifugally outward into the lubricant retaining reservoir or expansion chamber 10 which is formed by the inner face 11 of the race ring 2, the inner side 12 of the casing 1 and the inner face 13 of the concentric ring section 5. The lubricant being forced by the centrifugal action of the bearing into the reservoir 10 which extends radially outwardly beyond the housing 6 confines the lubricant to a concentrated axial space between the inner faces 11 and 13 of the reservoir 10 and radially surrounding the bearing elements 8 which results in the inward projecting concentric ring section 5 or 5a as the case may be, segregating and retarding the lubricant within the casing from axial expansive movement around the inner periphery 14 of the housing 6. The small amount of fixed clearance that is required for a suitable journaled slidable fit between the outer periphery of the race 4 and the inner periphery 14 of the housing 6 is sealed by the lubricant which minimizes any outward seepage of the lubricant from within the bearing, due to the bulk mass of the lubricant being centrifugally forced into the axially disposed reservoir 10 and retarded from capillary action by the concentric ring section 5 or 5a.

When the bearing is placed under a load the ball bearing elements 8, the reciprocative race ring 2 and the stepped lubricant retaining casing 1 assume the positions relative to the opposing race ring 4 as are shown in the dotted lines, this action results in the ball bearings 8 moving radially inward between the grooves of the opposing race rings 2 and 4 which displaces the lubricant from the cubical space under the ball bearings 8 into the cubical space that is created above the ball bearings. The reciprocative race ring 2 being moved axially towards the opposing race 4 also reduces the cubical space between the inner face 11 of the race ring 2 and the inner face 15 of the race ring 4. The combined action of the ball bearings 8 and the reciprocative race ring 2 compress the lubricant axially within the bearing with the lubricant being forced centrifugally outward against the interior walls 12 of the casing 1 into capillary action along the reservoir wall 12 until intercepted by the inner face 11 of the race ring 2 and the inner side 13 of the concentric ring section 5 or 5a which diverts the lubricant into centripetal action towards the rolling elements 8.

Figure 3:
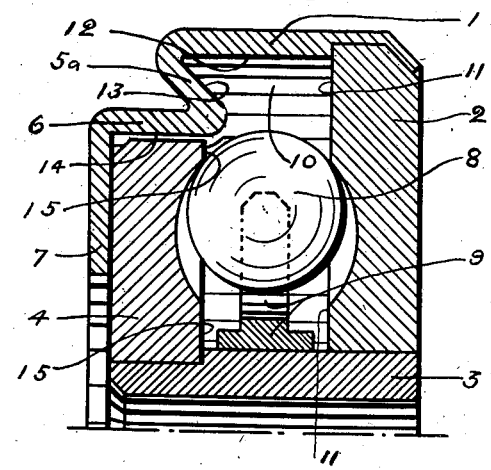
Fig. 3 is a partial enlarged section view showing an alternative stepped lubricant retaining casing for directing the flow of the lubricant over the ball bearing elements and also to increase the cubical space in the lubricant retaining reservoir so as to provide an adequate chamber to receive the compressed lubricant.

Referring to Fig. 3 showing an alternative form of stepped lubricant retaining casing 1 applied to a reciprocative race ring 2 and having a ball bearing load carrying element 8 and a separating element 9 interposed between opposing race rings 2 and 4 in which the bearing is running free without any load and in which the inclined concentric ring section 5a defines the step which distributes the lubricant from the reservoir or expansion chamber 10 by centripetal action towards the ball bearings 8.

Figure 4:
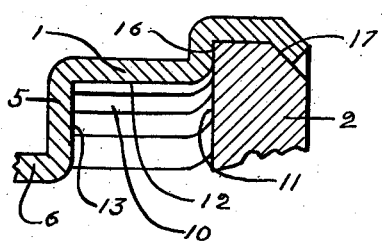
Fig. 4 is a partial enlarged fragmentary view in section showing an alternate method of attaching the stepped lubricant retaining casing to the race ring.

Referring to Fig. 4 which shows a modified method of attaching the stepped lubricant retaining casing 1 to the reciprocative race ring 2 by means of forming a shoulder 16 on the casing 1 to seat the race ring 2 and then spinning the edge of the casing over the chamfered end 17 of the race ring 2 as shown. Attention is directed to the fact that the housing 6 is to lie around the outer periphery of the race ring 4 with just enough clearance to admit of the formation of a filament of the lubricant between the outer periphery of the race ring 4 and the inner periphery 14 of the housing 6, which effects a constant unbroken sealing means between the outer periphery of the race ring 4 and the inner periphery 14 of the housing 6 regardless of any axial movement of the casing 1 relative to the race ring 4, or any axial movement of the race ring 4 relative to the housing 6 such as when a load is imposed and released from the rolling elements that are interposed between the opposing race rings. When the bearing is running free the flange 7 in this instance is maintained against the outer side of the race ring 4 by the rolling elements 8 as shown, in other types of bearings this is accomplished by the centrifugal action of the bearing rotating at high speeds spreading the race rings apart, which tends to maintain the flange 7 against the race ring 4 when there is no axial pressure imposed upon the outer face of the race ring 2 or on the outer face of the race ring 4.

Having described my invention in which the stepped lubricant retaining casing is attached to a reciprocative opposing race ring it is understood that the casing may be attached to an unreciprocative opposing race ring and the reciprocative opposing race ring may function within the housing and other types of anti-friction rolling elements and slight modifications than what are shown in this application may be embodied in this invention without departing from the spirit and the scope of the invention, and I reserve the right to construct the stepped lubricant retaining casing from non-ferrous or ferrous metals or alloys to conform with the claims of this invention.

Having described my invention, what I claim and desire to secure by Letters Patent is:

1. In a thrust bearing, the combination of a fixed race ring and a loose race ring having a larger external diameter than said fixed ring, said rings being co-axially spaced, rolling elements between the rings and means providing a lubricant chamber radially outward of said rolling elements comprising an annular housing member having a cylindrical portion secured at one end to the periphery of the loose ring and extending over the rolling elements, a portion extending perpendicularly from the other end of the cylindrical portion toward the bearing axis, an axial portion projecting from said last named portion parallel to and closely overlying the periphery of the fixed ring and a second radial portion extending inwardly from the axial portion along the outer surface of said fixed ring and spaced from said surface when said rings move toward each other.

2. In a thrust bearing, the combination of a fixed race ring and a loose race ring having a larger external diameter than said fixed ring, said rings being co-axially spaced, rolling elements between the rings and means providing a lubricant chamber radially outward of said rolling elements comprising an annular housing member having a cylindrical portion secured at one end to the periphery of the loose ring and extending over the rolling elements, a portion extending obliquely from the other end of the cylindrical portion toward the bearing axis, an axial portion projecting from said last named portion parallel to and closely overlying the periphery of the fixed ring and a second radial portion extending inwardly from the axial portion along the outer surface of said fixed ring and spaced from said surface when said rings move toward each other.

3. In a thrust bearing, the combination of a fixed race ring and a loose race ring having a larger external diameter than said fixed ring, said rings being co-axially spaced, rolling elements between the rings and means providing a lubricant chamber radially outward of said rolling elements comprising an annular housing member having a cylindrical portion secured at one end to the periphery of the loose ring and extending over the rolling elements, a portion extending from the other end of the cylindrical portion toward the bearing axis, an axial portion projecting from said last named portion parallel to and closely overlying the periphery of the fixed ring and a second radial portion extending inwardly from the axial portion along the outer surface of said fixed ring and spaced from said surface when said rings move toward each other.

WALTER E. HORROCKS.